United States Patent
Chang et al.

(10) Patent No.: US 6,873,382 B2
(45) Date of Patent: Mar. 29, 2005

(54) LIQUID CRYSTAL DISPLAY DEVICE HAVING ARRAY SUBSTRATE OF COLOR FILTER ON THIN FILM TRANSISTOR STRUCTURE AND MANUFACTURING METHOD THEREOF

(75) Inventors: Youn-Gyoung Chang, Kyonggi-do (KR); Seung-Ryul Park, Incheon-gwangyokshi (KR)

(73) Assignee: LG. Philips LCD Co., Ltd., Seoul (KR)

(*) Notice: Subject to any disclaimer, the term of this patent is extended or adjusted under 35 U.S.C. 154(b) by 97 days.

(21) Appl. No.: 10/421,707

(22) Filed: Apr. 24, 2003

(65) Prior Publication Data

US 2004/0001170 A1 Jan. 1, 2004

(30) Foreign Application Priority Data

Jun. 28, 2002 (KR) ................. 10-2002-0036998

(51) Int. Cl.[7] ................................... G02F 1/13
(52) U.S. Cl. .................. 349/106; 349/44; 349/43
(58) Field of Search ................. 349/43–44, 106

(56) References Cited

U.S. PATENT DOCUMENTS

| | | | | |
|---|---|---|---|---|
| 5,818,550 A | * | 10/1998 | Kadota et al. | 349/43 |
| 5,943,107 A | * | 8/1999 | Kadota et al. | 349/44 |
| 6,429,916 B1 | * | 8/2002 | Nakata et al. | 349/106 |
| 6,466,281 B1 | | 10/2002 | Huang et al. | 349/44 |
| 6,515,428 B1 | * | 2/2003 | Yeh et al. | 315/169.3 |

* cited by examiner

Primary Examiner—James A. Dudek
(74) Attorney, Agent, or Firm—Morgan Lewis & Bockius LLP

(57) ABSTRACT

A liquid crystal display device having an array substrate of a color filter on a thin film transistor structure and a manufacturing method thereof are disclosed in the present invention. The liquid crystal display device having an array substrate includes an array substrate, a plurality of gate lines and data lines over the substrate, the gate and data lines defining a pixel region, a thin film transistor formed at each crossing region of the gate lines and the data lines, the thin film transistor including a gate electrode, an active layer, a source electrode, and a drain electrode, a black matrix over the thin film transistor, exposing a portion of the drain electrode, a first pixel electrode at the pixel region, contacting the exposed portion of the drain electrode, a color filter on the first pixel electrode at the pixel region, and a second pixel electrode on the color filter, directly contacting the first pixel electrode.

24 Claims, 16 Drawing Sheets

LIQUID CRYSTAL DISPLAY DEVICE HAVING ARRAY SUBSTRATE OF COLOR FILTER ON THIN FILM TRANSISTOR STRUCTURE AND MANUFACTURING METHOD THEREOF

This application claims the benefit of the Korean Application No. P2002-036998 filed on Jun. 28, 2002, which is hereby incorporated by reference.

BACKGROUND OF THE INVENTION

1. Field of the Invention

The present invention relates to a liquid crystal display device, and more particularly, to a liquid crystal display device having an array substrate of a color filter on thin film transistor structure and a manufacturing method thereof. Although the present invention is suitable for a wide scope of applications, it is particularly suitable for increasing an aperture ratio and simplifying the fabrication process.

2. Discussion of the Related Art

In general, since flat panel display devices are thin, light weight, and have low power consumption, they have been used for displays of portable devices. Among the various types of flat panel display devices, liquid crystal display (LCD) devices are widely used for laptop computers and desktop computer monitors because of their superiority in resolution, color image display, and display quality.

Optical anisotropy and polarization properties of liquid crystal molecules are utilized to generate a predetermined image. Liquid crystal molecules have a specific alignment that results from their own peculiar characteristics. The specific alignment can be modified by electric fields that are applied upon the liquid crystal molecules. In other words, the electric fields applied upon the liquid crystal molecules can change the alignment of the liquid crystal molecules. Due to optical anisotropy, incident light is refracted according to the alignment of the liquid crystal molecules.

Specifically, the LCD devices include upper and lower substrates having electrodes that are spaced apart and face into each other, and a liquid crystal material is interposed therebetween. Accordingly, when a voltage is applied to the liquid crystal material through the electrodes of each substrate, an alignment direction of the liquid crystal molecules is changed in accordance with the applied voltage in order to display images. By controlling the applied voltage, the LCD device provides various transmittances for rays of light to display image data.

The liquid crystal display (LCD) devices are widely applied in office automation (OA) and video equipment due to their characteristics of light weight, thin design, and low power consumption. Among different types of LCD devices, active matrix LCDs (AM-LCDs) having thin film transistors and pixel electrodes arranged in a matrix form offer high resolution and superiority in displaying moving images. A typical LCD panel has an upper substrate, a lower substrate, and a liquid crystal material layer interposed therebetween. The upper substrate, referred to as a color filter substrate, includes a common electrode and color filters. The lower substrate, referred to as an array substrate, includes switching elements such as thin film transistors (TFT's) and pixel electrodes.

As previously described, the operation of an LCD device is based on the principle that the alignment direction of the liquid crystal molecules depends upon applied electric fields between the common electrode and the pixel electrode. Accordingly, the liquid crystal molecules function as an optical modulation element having variable optical characteristics that depend upon the polarity of the applied voltage.

FIG. 1 is an expanded perspective view illustrating a related art active matrix LCD device. As shown in FIG. 1, the LCD device 11 includes an upper substrate 5, referred to as a color filter substrate, and a lower substrate 22, referred to as an array substrate, having a liquid crystal material layer 14 interposed therebetween. On the upper substrate 5, a black matrix 6, and a color filter layer 8 are formed in a shape of an array matrix including a plurality of red (R), green (G), and blue (B) color filters surrounded by corresponding portions of the black matrix 6. Additionally, a common electrode 18 is formed on the upper substrate 5 to cover the color filter layer 8 and the black matrix 6.

On the lower substrate 22, a plurality of thin film transistors T are formed in a shape of an array matrix corresponding to the color filter layer 8. A plurality of crossing gate lines 13 and data lines 15 are perpendicularly positioned such that each TFT T is located adjacent to each intersection of the gate lines 13 and the data lines 15. Furthermore, a plurality of pixel electrodes 17 are formed on a pixel region P defined by the gate lines 13 and the data lines 15 of the lower substrate 22. The pixel electrode 17 includes a transparent conductive material having high transmissivity, such as indium-tin-oxide (ITO) or indium-zinc-oxide (IZO).

Still in FIG. 1, a storage capacitor C is disposed to correspond to each pixel P and connected in parallel to each pixel electrode 17. The storage capacitor C is comprised of a portion of the gate line 13 as a first capacitor electrode, an storage metal layer 30 as a second capacitor electrode, and an interposed insulator (reference numeral 16 of FIG. 2). Since the storage metal layer 30 is connected to the pixel electrode 17 through a contact hole, the storage capacitor C electrically contacts the pixel electrode 17.

In the related art LCD device shown in FIG. 1, a scanning signal is applied to a gate electrode of the thin film transistor T through the gate line 13, and a data signal is applied to a source electrode of the thin film transistor T through the data line 15. As a result, the liquid crystal molecules of the liquid crystal material layer 14 are aligned and arranged by operation of the thin film transistor T, and incident light passing through the liquid crystal layer 14 is controlled to display an image. However, since the pixel and common electrodes 17 and 18 are positioned on the upper and lower substrates 5 and 22, respectively, the electric fields induced between the upper and lower substrates 5 and 22 are perpendicular to the surfaces of the upper and lower substrates 5 and 22.

When fabricating the LCD device 11 of FIG. 1, the upper substrate 5 is aligned with and attached to the lower substrate 22. In this process, the upper substrate 5 may be misaligned with the lower substrate 22 and light leakage may occur in the completed LCD device 11 due to an error margin in attaching the upper and lower substrate 5 and 22.

FIG. 2 is a schematic cross-sectional view taken along line II—II of FIG. 1, illustrating a pixel of the related art liquid crystal display (LCD) device.

As shown in FIG. 2, the related art LCD device includes the upper substrate 5, the lower substrate 22, and the liquid crystal layer 14. The upper and lower substrates 5 and 22 are spaced apart from each other, and the liquid crystal layer 14 is interposed therebetween. The upper and lower substrates 5 and 22 are often referred to as an array substrate and a color filter substrate, respectively, because the color filter layer 8 is formed upon the upper substrate and a plurality of array elements are formed on the lower substrate 22.

In FIG. 2, the thin film transistor T is formed on the front surface of the lower substrate 22. The thin film transistor T includes a gate electrode 32, an active layer 34, a source electrode 36, and a drain electrode 34. Between the gate electrode 32 and the active layer 34, a gate insulation layer 16 is interposed to protect the gate electrode 32. As shown in FIG. 1, the gate electrode 32 extends from the gate line 13 and the data electrode 36 extends from the data line 15. All of the gate, source, and drain electrodes 32, 36, and 38 are formed of a metallic material while the active layer 34 is formed of silicon. A passivation layer 40 is formed on the thin film transistor T for protection. In the pixel region P, the pixel electrode 17 that is formed of a transparent conductive material is disposed while contacting the drain electrode 38 and the storage metal layer 30.

Meanwhile, as mentioned above, the gate electrode 13 acts as a first electrode of the storage capacitor C and the storage metal layer 30 acts as a second electrode of the storage capacitor C. Thus, the gate electrode 13 and the storage metal layer 30 constitutes the storage capacitor C with the interposed gate insulation layer 16.

Still referring to FIG. 2, the upper substrate 5 is spaced apart from the first substrate 22 over the thin film transistor T. On the rear surface of the upper substrate 5, a black matrix 6 is disposed in the position corresponding to the thin film transistor T and the gate line 13. The black matrix 6 is formed on the entire surface of the upper substrate 5 and have openings corresponding to the pixel electrode 17 of the lower substrate 11, as shown in FIG. 1. The black matrix 22 prevents light leakage in the LCD panel except for the portion for the pixel electrode 17. The black matrix 6 protects the thin film transistor T from the light such that the black matrix 6 prevents generating of photo current in the thin film transistor T. The color filter layer 8 is formed on the rear surface of the upper substrate 5 to cover the black matrix 6. Each of the color filters 8 has one of the red, green, and blue colors and corresponds to one pixel region where the pixel electrode 17 is located. A common electrode 18 formed of a transparent conductive material is disposed on the color filter layer 8 over the upper substrate 5.

In the related art LCD panel mentioned above, the pixel electrode 17 has a one-to-one correspondence with one of the color filters. Furthermore, in order to prevent a crosstalk between the pixel electrode 17 and the gate and data lines 13 and 15, the pixel electrode 17 is spaced apart from the data line 15 by the distance A and from the gate line 13 by the distance B, as shown in FIG. 2. The open spaces A and B between the pixel electrode 17 and the data and gate line 15 and 13 cause a malfunction such as light leakage in the LCD device. Namely, the light leakage mainly occurs in the open spaces A and B so that the black matrix 6 formed on the upper substrate 5 should cover those open spaces A and B. However, when arranging the upper substrate 5 with the lower substrate 22 or vice versa, a misalignment may occur between the upper substrate 5 and the lower substrate 22. Therefore, the black matrix 6 is extended to cover those open spaces A and B. That is, the black matrix 6 is designed to provide an aligning margin to prevent light leakage. However, in the case of extending the black matrix, an aperture ratio of the liquid crystal panel is reduced as much as the aligning margin of the black matrix 6. Moreover, if there are errors in the aligning margin of the black matrix 6, the light leakage occurs in the open spaces A and B, and deteriorates the image quality of the LCD device.

SUMMARY OF THE INVENTION

Accordingly, the present invention is directed to a liquid crystal display device having an array substrate of a color filter on a thin film transistor structure and a manufacturing method thereof that substantially obviates one or more of problems due to limitations and disadvantages of the related art.

Another object of the present invention is to provide an array substrate for a liquid crystal display device, which provides a high aperture ratio.

Another object of the present invention is to provide a method of forming an array substrate for a liquid crystal display device, which simplifies a manufacturing process and increases a manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device having an array substrate includes a plurality of gate lines and data lines over the array substrate, the gate and data lines defining a pixel region, a thin film transistor formed at each crossing region of the gate lines and the data lines, the thin film transistor including a gate electrode, an active layer, a source electrode, and a drain electrode, a black matrix over the thin film transistor, exposing a portion of the drain electrode, a first pixel electrode at the pixel region, contacting the exposed portion of the drain electrode, a color filter on the first pixel electrode at the pixel region, and a second pixel electrode on the color filter, contacting the first pixel electrode.

The liquid crystal display device having an array substrate further includes a first insulating layer between the gate electrode and the active layer, and a second insulating layer between the black matrix and the thin film transistor. The first and second insulating layers are formed of an inorganic material selected from the group consisting of silicon nitride and silicon oxide.

The liquid crystal display device of the present invention further includes a storage capacitor at the pixel region, which comprises an storage metal layer on the first insulating layer and a portion of the gate line acting as a first storage electrode. The second pixel electrode contacts the storage metal layer through a storage contact hole in the black matrix and the second insulating layer. The first pixel electrode contacts the drain electrode through a drain contact hole in the black matrix and the second insulating layer.

Alternately, the black matrix exposes an end side portion of the drain electrode, so that the first pixel electrode contacts the side portion of the drain electrode. The liquid crystal display device further includes an ohmic contact layer between the active layer and the source and drain electrodes. Herein, the color filter is formed between the first pixel electrode and the second pixel electrode.

In another aspect of the present invention, a method of forming a liquid crystal display device having an array substrate includes forming a plurality of gate lines and data lines over the array substrate, the gate and data lines defining a pixel region, forming a thin film transistor formed at each crossing region of the gate lines and the data lines, the thin film transistor including a gate electrode, an active layer, a source electrode, and a drain electrode, forming a black matrix over the thin film transistor, exposing a portion of the drain electrode, forming a first pixel electrode at the pixel region, contacting the exposed portion of the drain electrode, forming a color filter on the first pixel electrode at the pixel region, and forming a second pixel electrode on the color filter, contacting the first pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
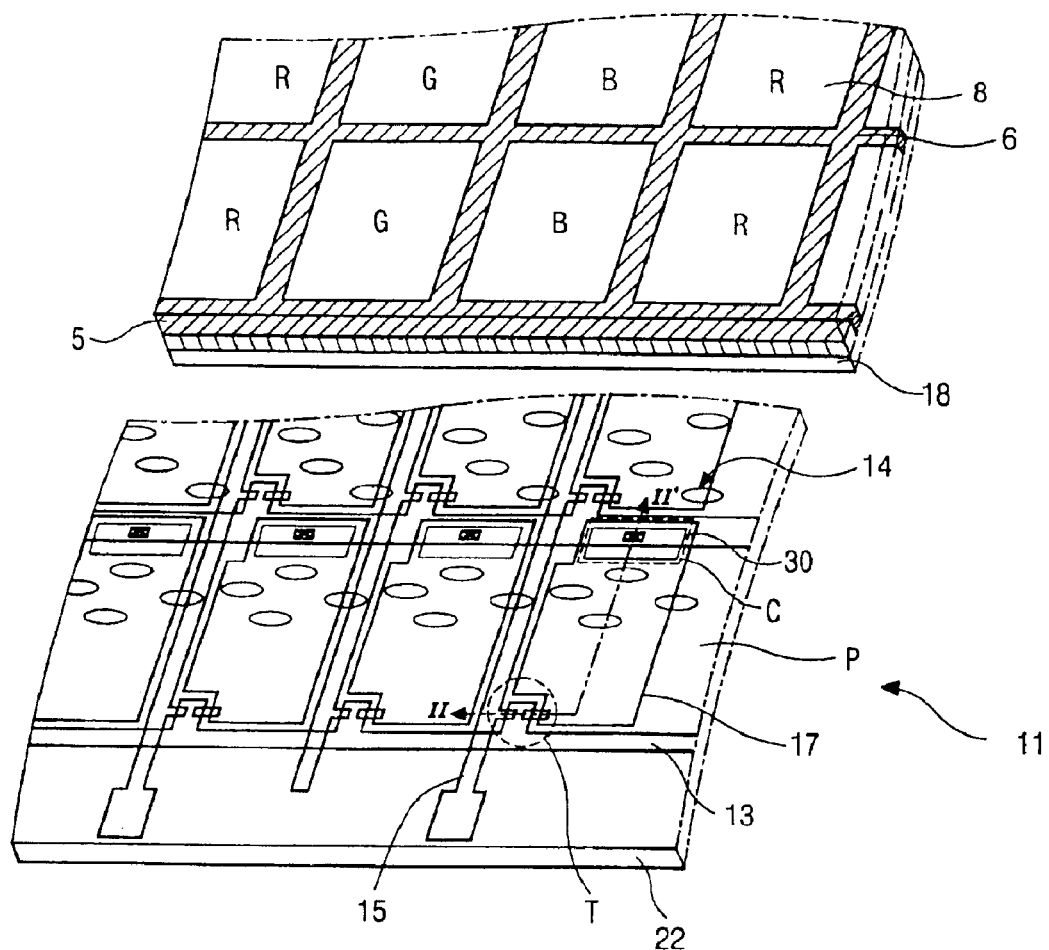
FIG. 1 is an expanded perspective view illustrating a related art liquid crystal display device.
Figure 2:
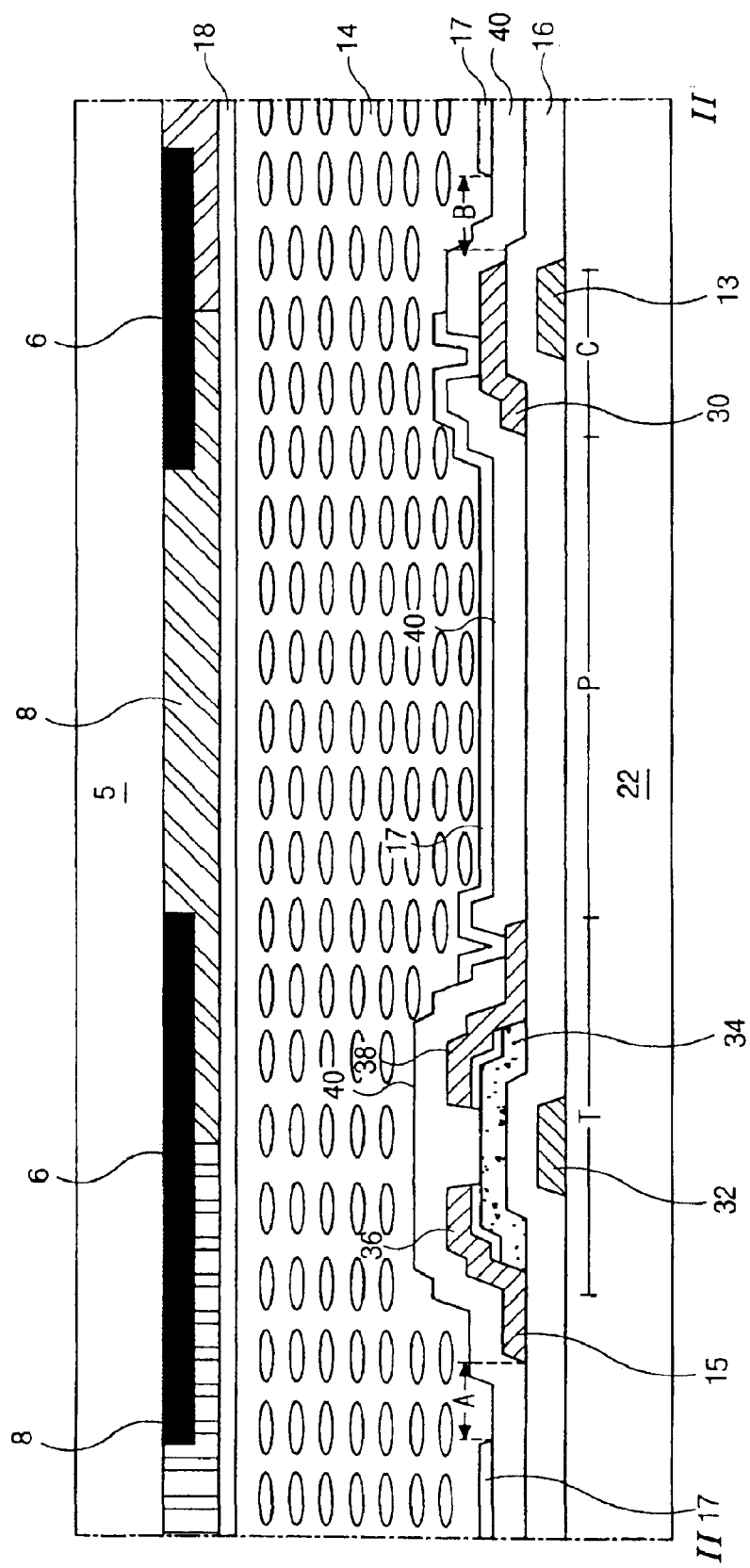
FIG. 2 is a schematic cross-sectional view taken along line II—II of FIG. 1, illustrating a pixel of the related art liquid crystal display device.
Figure 3:
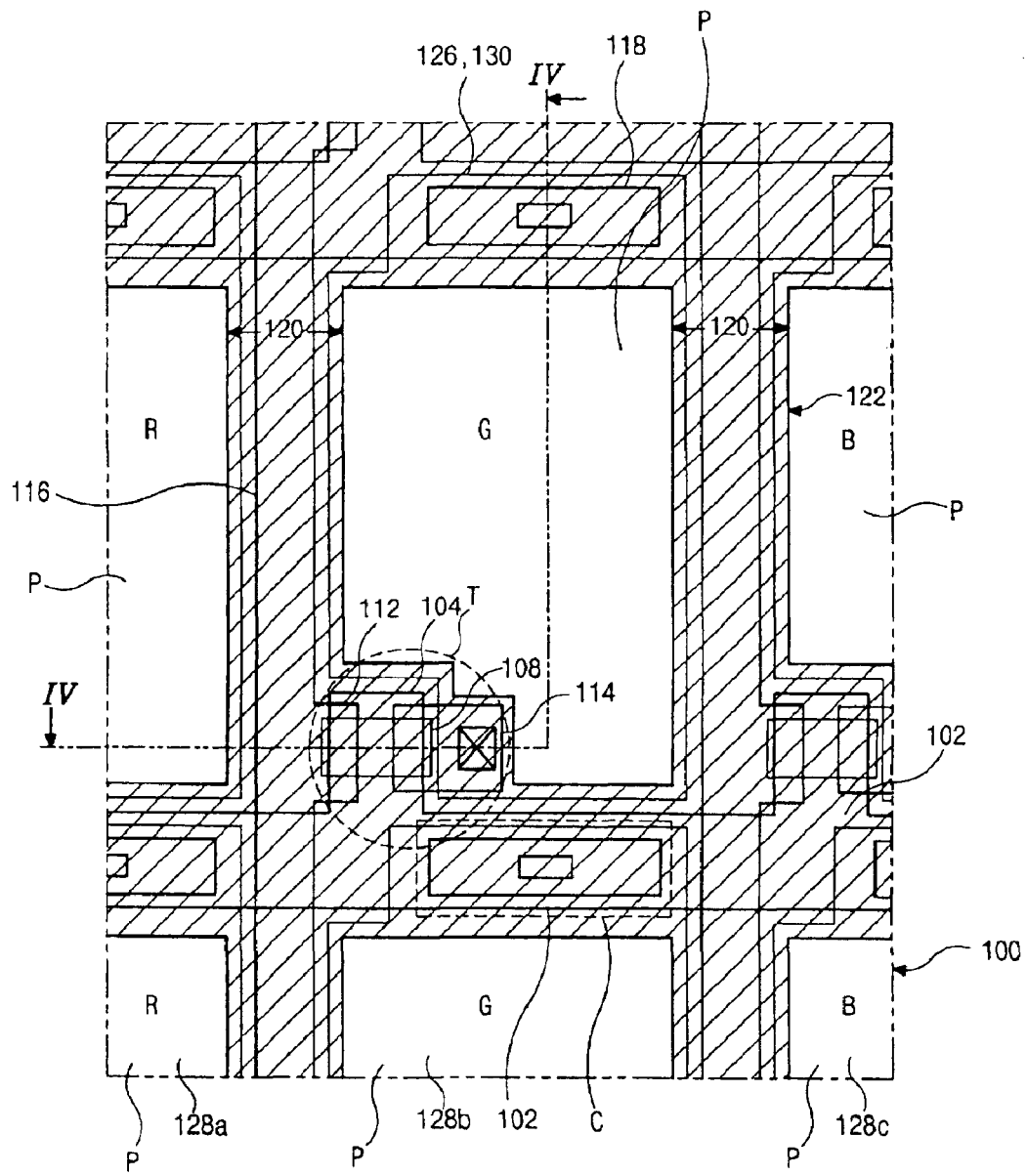
FIG. 3 is a partial schematic plane view of an array substrate having a color filter on thin film transistor structure according to the present invention.

FIG. 3 is a partial schematic plane view of an array substrate having a color filter on thin film transistor structure according to the present invention.

As shown in FIG. 3, an array substrate 100 includes a plurality of gate lines 102 disposed in a transverse direction and a plurality of data lines 116 disposed in a longitudinal direction. The plurality of gate lines 102 and the plurality of data lines 116 cross one another defining a pixel region P. A thin film transistor T is formed at each crossing portion of the gate line 102 and the data line 116. The thin film transistor T includes a gate electrode 104, an active layer 108, a source electrode 112, and a drain electrode 114. In the pixel regions P defined by the plurality of gate lines and data lines 102 and 116, a plurality of color filters 128 are located therein. Additionally, a double-layered pixel electrode is disposed corresponding to each pixel region P. A first pixel electrode 126 and a second pixel electrode 130 have the same shape. Although not indicated in FIG. 3, the first pixel electrode 126 is disposed beneath the color filter 128 and contacts the drain electrode 114, and the second pixel electrode 130 is disposed on the color filter 128 and contacts the first pixel electrode 126. Namely, the color filter 128 is located between the first and second pixel electrodes 126 and 130, and the second pixel electrode 130 electrically contacts the drain electrode 114 through the first pixel electrode 126.

Meanwhile, a storage capacitor C is included in a portion of the gate line 102 and the storage metal layer 118. Thus, the portion of the gate line 102 acts as a first electrode of the storage capacitor C. And, the storage metal layer 118 acts as a second electrode of the storage capacitor C. The first and second pixel electrodes 126 and 130 electrically contact the storage metal layer 118, so that they are electrically connected to the storage capacitor C in parallel.

The array substrate 100 of FIG. 3 has a color filter on thin film transistor (COT) structure. In such a COT structure, a black matrix 120 and the color filters 128 are formed on the array substrate 100. The black matrix 120 is disposed to correspond to the thin film transistors T and the gate lines 102 and the data lines 116, so that it prevents light leakage in the LCD device. The black matrix 120 is formed of an opaque organic material, thereby blocking the light incident to the thin film transistors T. Also, it protects the thin film transistors T from the external impact. Moreover, the first pixel electrode 126 disposed underneath the color filter 128 protects the gate line 102 from a developer that damages the color filter 128 in the fabrication process.

FIGS. 4A to 4G are cross-sectional views taken along line IV—IV of FIG. 3, illustrating the process steps of manufacturing an array substrate according to a first embodiment of the presenting invention.

Figure 4A:
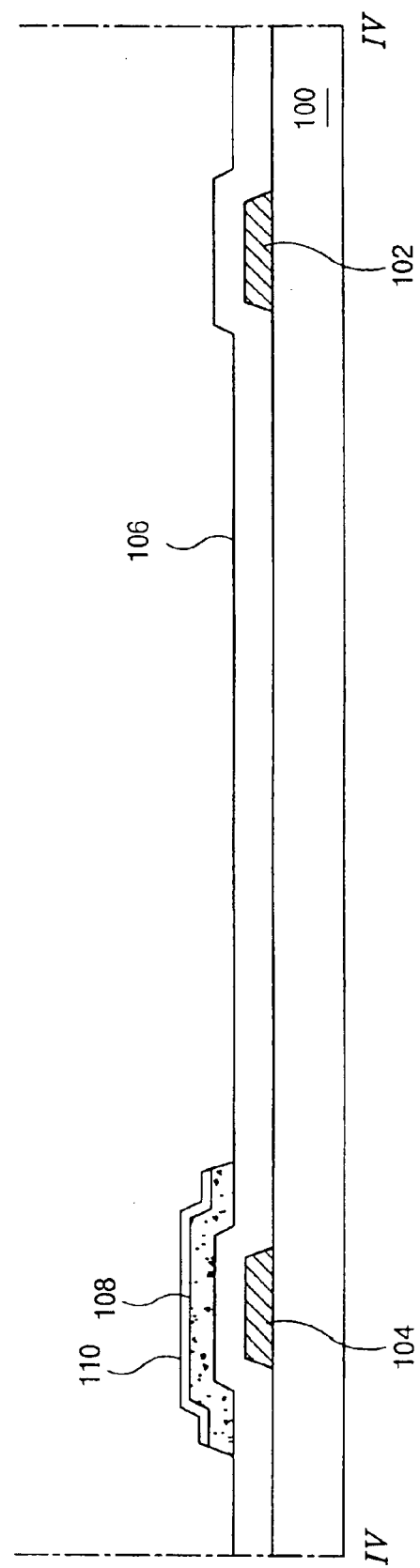
FIGS. 4A to 4G are cross-sectional views taken along line IV—IV of FIG. 3, illustrating the process steps of manufacturing the array substrate according to a first embodiment of the presenting invention.

In FIG. 4A, a first metal layer is deposited on the surface of a substrate 100 and then patterned to form a gate line 102 and a gate electrode 104. Thereafter, a gate insulation layer 106 (or a first insulating layer) is formed on the substrate 100 to cover the gate line 102 and the gate electrode 104. The gate insulation layer 106 is formed of an inorganic material, such as silicon nitride ($SiN_x$) and silicon oxide ($SiO_2$). An intrinsic amorphous silicon layer (a-Si:H) and then an $n^+$-doped amorphous silicon layer ($n^+$a-Si:H) are sequentially deposited on the entire surface of the gate insulation layer 106 and then simultaneously patterned to form an active layer 108. An ohmic contact layer 110 is then formed on the active layer 108.

Figure 4B:
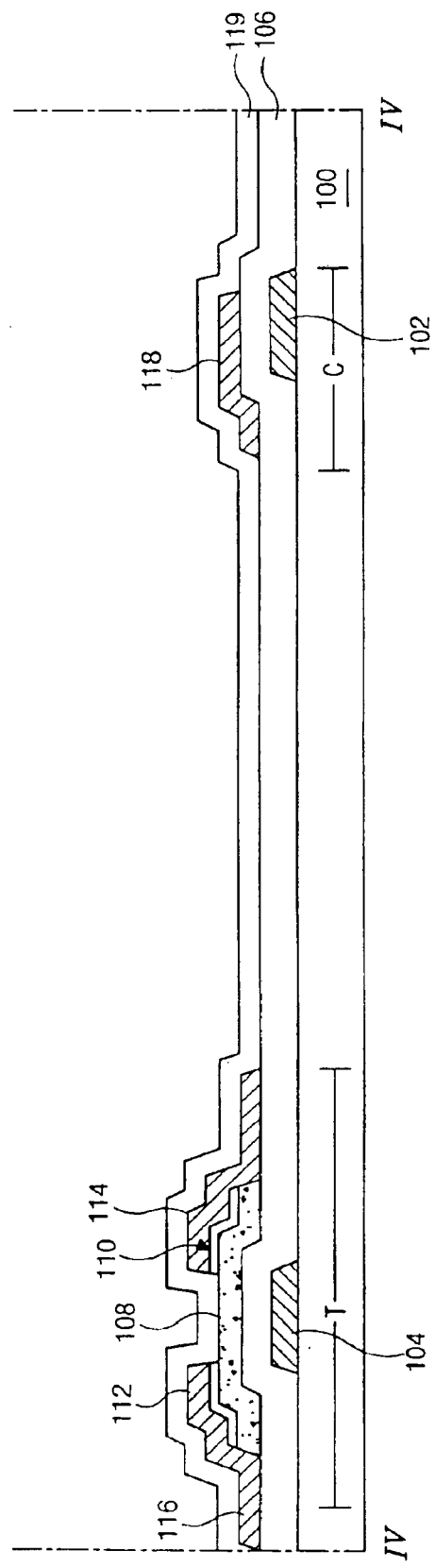

In FIG. 4B, after forming the active layer 108 and the ohmic contact layer 110, a second metal layer is deposited over the substrate 100, and then patterned to form a source electrode 112, a drain electrode 114, a data line 116, and a storage metal layer 118. The second metal layer may be formed of one of chromium (Cr), molybdenum (Mo), copper (Cu), tantalum (Ta) and an alloy of any combination thereof. The source electrode 112 extends from the data line 116 and contacts one portion of the ohmic contact layer 110. The drain electrode 114 is spaced apart from the source electrode 112 and then contacts the other portion of the ohmic contact layer 110. The storage metal layer 118 overlaps the gate line 102. After that, a portion of the ohmic contact layer 110 between the source and drain electrodes 112 and 114 is etched by using the source and drain electrodes 112 and 114 as masks. Therefore, a thin film transistor T and a storage capacitor C are complete. For example, the source and drain electrodes 112 and 114 may be formed of a bi-layer of copper/molybdenum. As described with reference to FIG. 3, the thin film transistor T is comprised of the gate electrode 104, the active layer 108, the ohmic contact layer 110, the source electrode 112, and the drain electrode 114. And the storage capacitor C is comprised of the gate line 102, the storage metal layer 118, and the interposed first insulator 106.

Thereafter, a second insulating layer 119 is deposited over the entire surface of the substrate 100 to cover the patterned second metal layer. The second insulating layer 119 may be formed of silicon nitride ($SiN_x$) or silicon oxide ($SiO_2$). The second insulating layer 119 enhances the adhesion of an organic layer to be formed in a later step. The second insulating layer 119 prevents a bad contact between the active layer 108 and the organic layer. If the bad contact does not occur between the active layer 108 and the organic material, the second insulating layer 119 is not necessary.

Figure 4C:
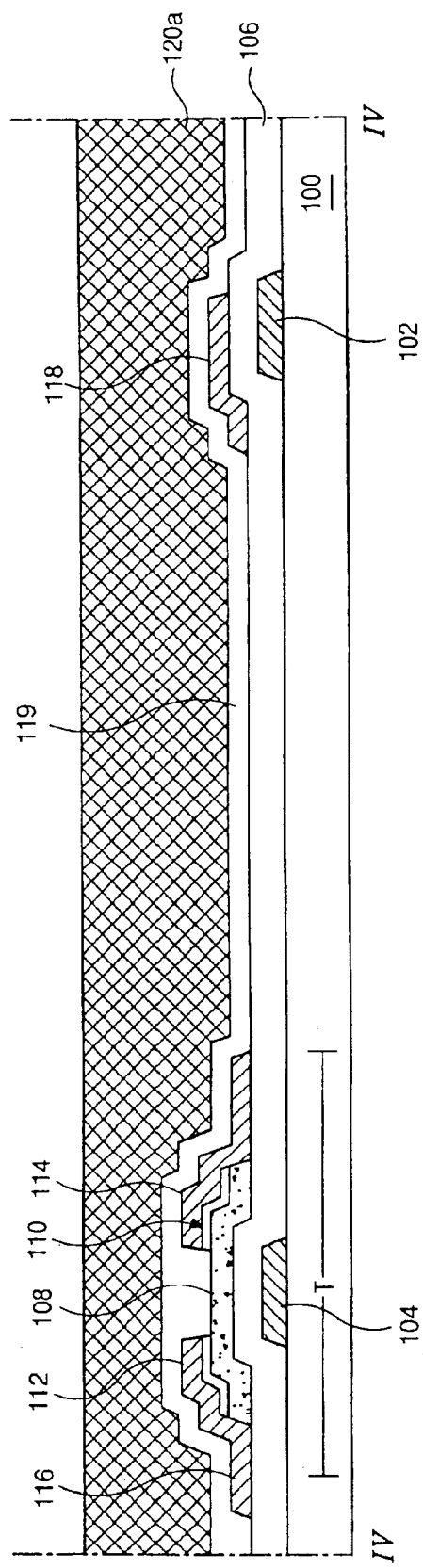

In FIG. 4C, an opaque organic material 120a having a low dielectric constant is deposited on the second insulating layer 119. The opaque organic material 120a has a black color so that it becomes a black matrix.

Figure 4D:
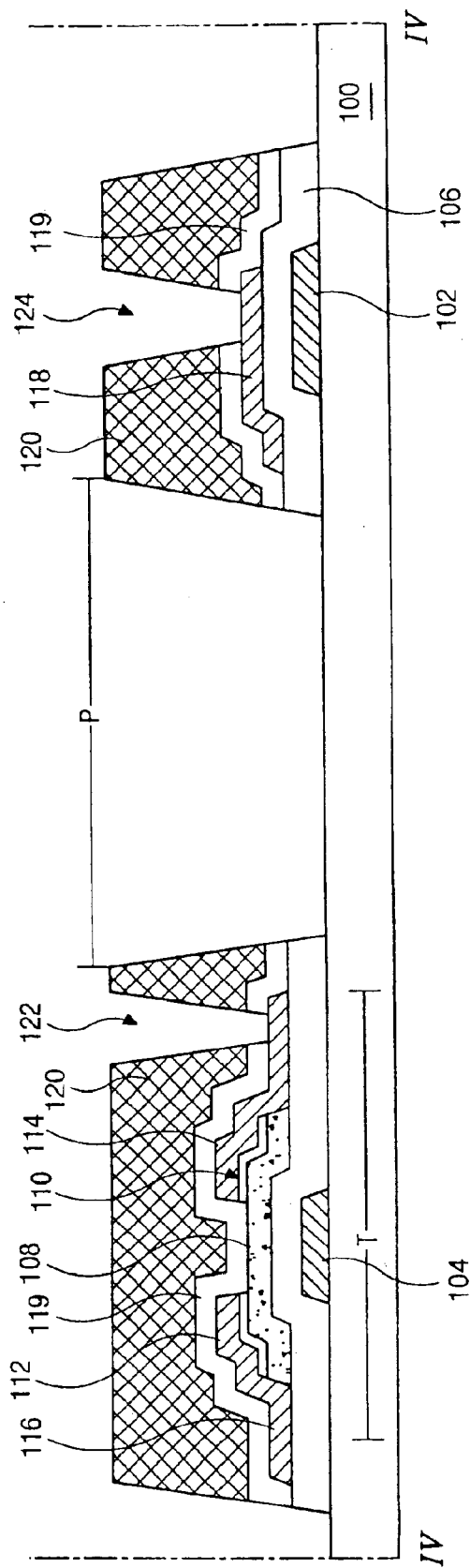

FIG. 4D shows the steps of forming a black matrix. The opaque organic material 120a formed on the second insulating layer 119 is patterned, so that a black matrix 120 is formed over the thin film transistor T, the data line 116, and the gate line 102. Since the black matrix 120 is formed of an organic material, it protects the thin film transistor T. A transparent organic or inorganic material may be employed as a TFT-protection layer instead of the opaque organic material 120a. However, an additional process of forming a black matrix on the upper substrate is required to use the transparent material. When patterning the opaque organic material 120a to form the black matrix 120, a drain contact hole 122 and a storage contact hole 124 are formed exposing a portion of the drain electrode 114 and a portion of the storage metal layer 118, respectively. Moreover, when patterning the opaque organic material 120a, portions of the first and second insulators 106 and 119 corresponding to the pixel region P are also removed to expose a portion of the substrate 100. Alternatively, when patterning the opaque organic material 120a, the gate insulation layer 106 may remain in order to control the height of a color filter to be formed in a later process. Namely, the height of the color filter is determined by the existence of the gate insulation layer 106.

Figure 4E:
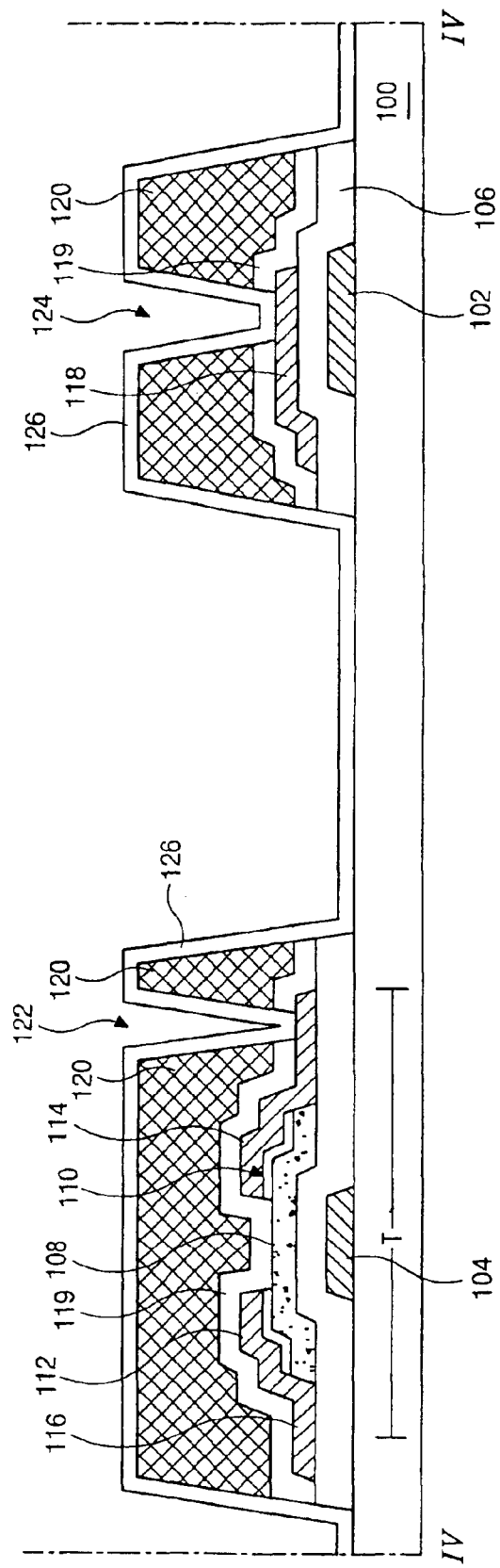

In FIG. 4E, a first transparent electrode layer 126 of indium tin oxide (ITO) or indium zinc oxide (IZO) is deposited over the entire surface of the substrate 100 to cover the black matrix 120. The first transparent electrode layer 126 contacts the drain electrode 114 through the drain contact hole 122 and the storage metal layer 118 through the storage contact hole 124. The first transparent electrode layer 126 prevents a developer for patterning color filters in a later process from penetrating into the gate insulation layer 106.

In step portions of the gate line 102 and gate electrode 104, the gate insulation layer 106 may be formed with poor quality and may have defects such as pinholes and cracks. Therefore, when patterning the color filters, the developer for the color filters may penetrate into the gate insulation layer 106 and then deteriorate the gate line 102 and the gate electrode 104. By forming the first transparent electrode layer 126, such deterioration can be prevented and process stability can be provided.

Figure 4F:
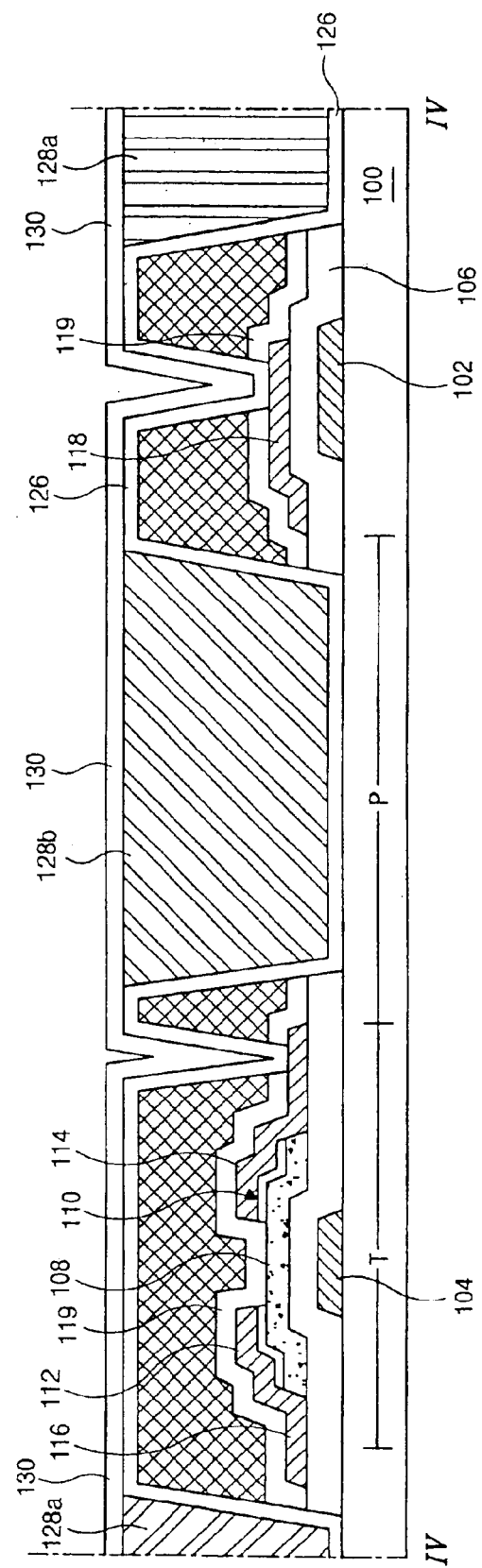

In FIG. 4F, color resin is formed on the first transparent electrode layer 126 and then patterned to form the color filters 128a, 128b, and 128c. As described above, the color filters 128a, 128b, and 128c for displaying a full spectrum of colors are formed in the pixel regions P. Thereafter, a second transparent electrode layer 130 is formed on the color filters 128 and the exposed portions of the first transparent electrode layer 126. The second transparent electrode layer 130 is formed of indium tin oxide (ITO) or indium zinc oxide (IZO) like the first transparent electrode layer 126. As shown in FIG. 4F, the second transparent electrode layer 130 contacts the first transparent electrode layer 126.

Figure 4G:
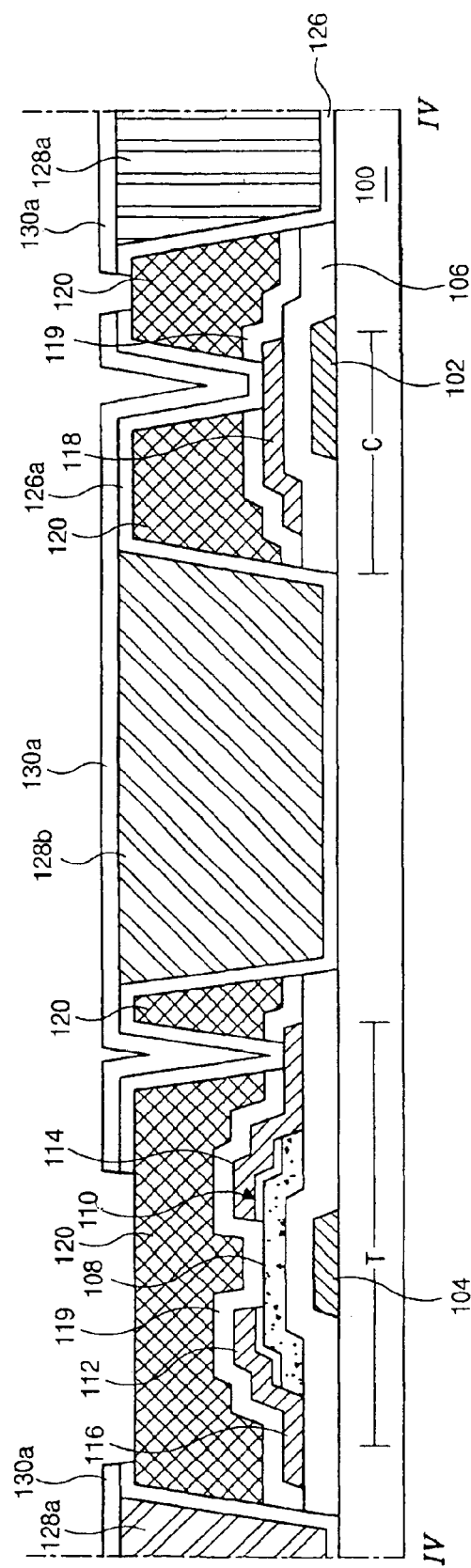

FIG. 4G shows the process step of patterning the first and second transparent electrode layers 126 and 130 to form a double-layered pixel electrode (i.e., often referred as a sandwich pixel electrode). The first and second transparent electrode layers 126 and 130 are simultaneously patterned with the same mask, so that the sandwich pixel electrode is formed corresponding to each pixel region P. Alternatively, the first transparent electrode layers 126 may be first patterned and then the color filters formed thereon. Thereafter, the second transparent electrode layer 130 may be patterned. The sandwich pixel electrode is comprised of a first pixel electrode 126a and a second pixel electrode 130a.

Accordingly, in the first embodiment of the present invention, the black matrix 120 and the color filters 128 are formed in the lower substrate 100, so that the liquid crystal display device can have a high aperture ratio. Further, since the pixel electrode has a double-layered structure, the process stability is improved during the fabricating process of the array substrate.

With reference to FIGS. 5A to 5F, a second embodiment of the present invention will now be explained. In the second embodiment, a pixel electrode flanks on a drain electrode as well as contacts the end side portion of the drain electrode.

FIGS. 5A to 5F are cross-sectional view illustrating the process steps of manufacturing the array substrate of FIG. 3 according to a second embodiment of the present invention. In the second embodiment of the present invention, the formation process of a thin film transistor and a storage capacitor is the same as that of the first embodiment.

Figure 5A:
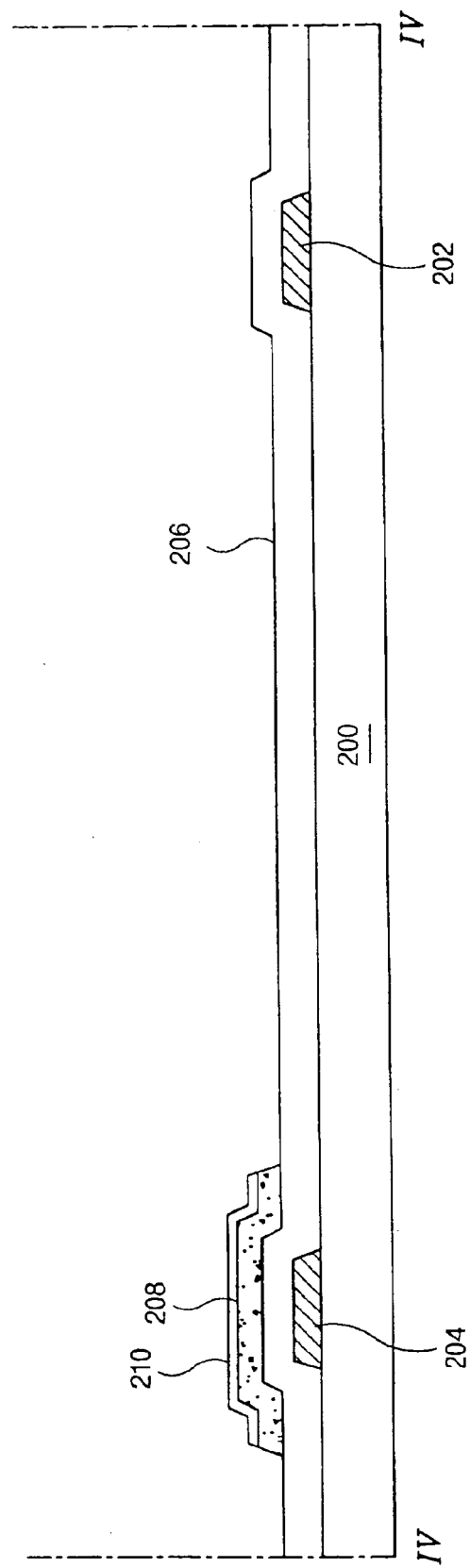
FIGS. 5A to 5F are cross-sectional views illustrating the process steps of manufacturing the array substrate according to a second embodiment of the present invention.

In FIG. 5A, a first metal layer is deposited on the surface of a substrate 200 and then patterned to form a gate line 202 and a gate electrode 204. Thereafter, a gate insulation layer 206 (or a first insulating layer) is formed on the substrate 200 to cover the gate line 202 and the gate electrode 204. The gate insulation layer 206 may be formed of an inorganic material, such as silicon nitride ($SiN_x$) or silicon oxide ($SiO_2$). An intrinsic amorphous silicon layer (a-Si:H) and an n$^+$-doped amorphous silicon layer (n$^+$a-Si:H) are sequentially deposited on the entire surface of the gate insulation layer 206, and then simultaneously patterned to form an active layer 208. Then, an ohmic contact layer 210 is formed on the active layer 208.

Figure 5B:
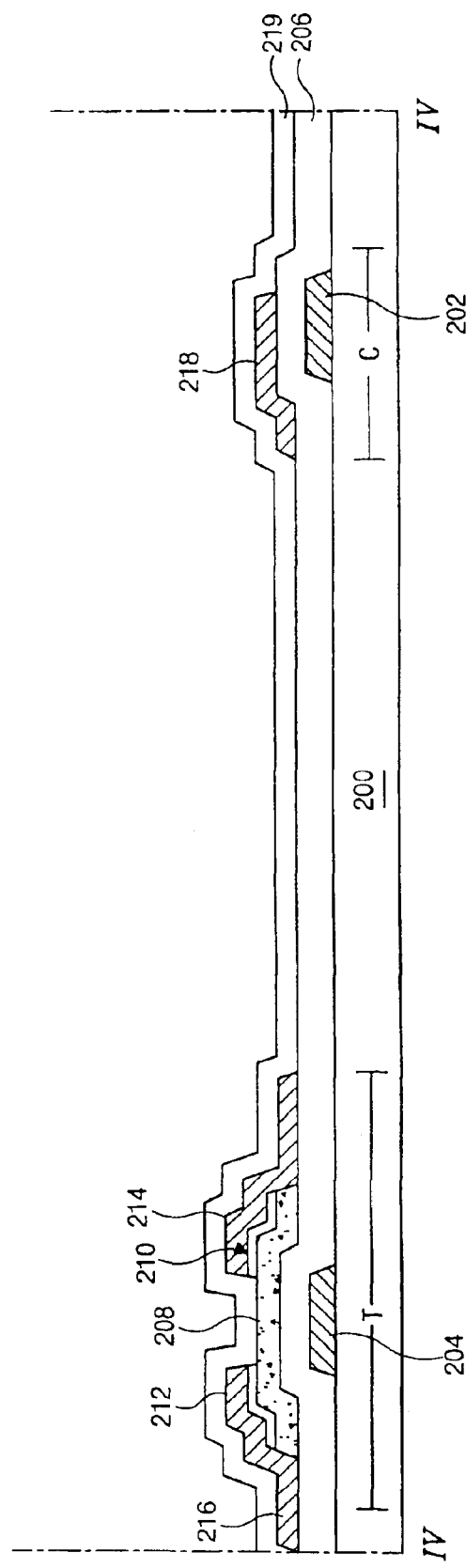

In FIG. 5B, after forming the active layer 208 and the ohmic contact layer 210, a second metal layer is deposited over the entire substrate 200 and then patterned to form a source electrode 212, a drain electrode 214, a data line 216, and an storage metal layer 218. The second metal layer may be formed of one of chromium (Cr), molybdenum (Mo), copper (Cu), tantalum (Ta), and an alloy of any combination thereof. The source electrode 212 extends from the data line 216 and contacts one portion of the ohmic contact layer 210. The drain electrode 214 is spaced apart from the source electrode 212 and then contacts the other portion of the ohmic contact layer 210. The storage metal layer 218 overlaps the gate line 202. Thereafter, a portion of the ohmic contact layer 210 between the source and drain electrodes 212 and 214 is etched using the source and drain electrodes 212 and 214 as masks. Therefore, a thin film transistor T and a storage capacitor C are complete. As mentioned with reference to FIG. 3, the thin film transistor T is comprised of the gate electrode 204, the active layer 208, the ohmic contact layer 210, the source electrode 212, and the drain electrode 214. And the storage capacitor C is comprised of the gate line 202, the storage metal layer 218, and the interposed gate insulation layer 206.

After completing the thin film transistor T and the storage capacitor C, a second insulating layer 219 is deposited over the entire of the substrate 200 to cover the patterned second metal layer. The second insulating layer 219 may be formed of silicon nitride ($SiN_x$) or silicon oxide ($SiO_2$). The second insulating layer 219 enhances the adhesion of an organic layer to be formed in a later process. The second insulating layer 219 prevents a bad contact between the active layer 208 and the later-formed organic material. If the bad contact does not occur between the active layer 208 and the organic material, the second insulating layer 219 is not necessary.

Figure 5C:
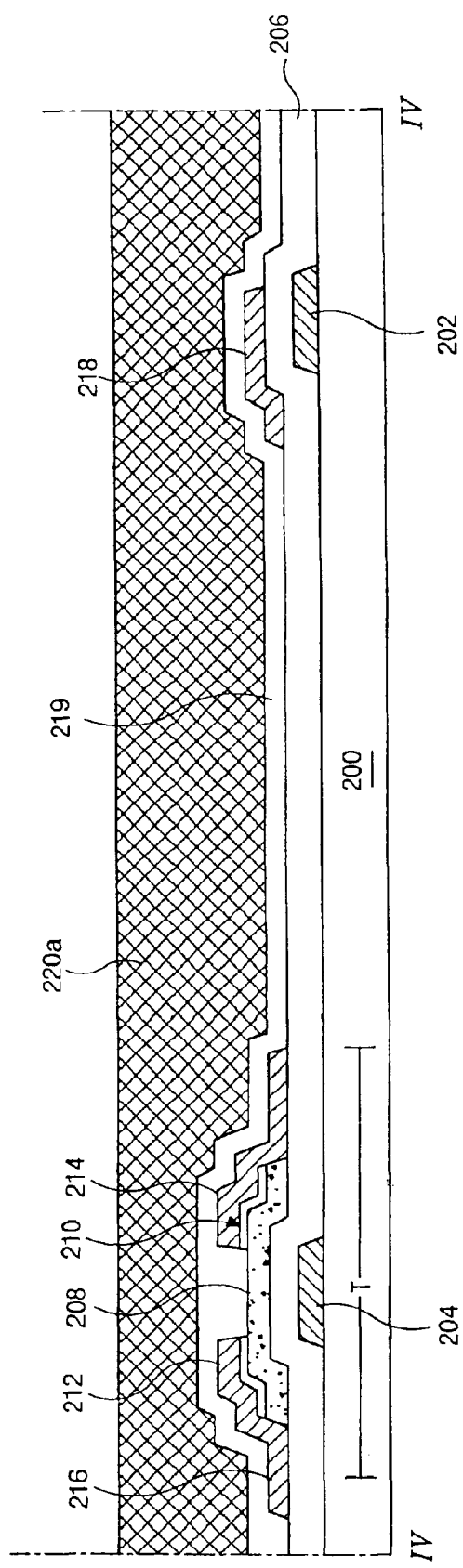

In FIG. 5C, an opaque organic material 220a having a low dielectric constant is deposited on the second insulating layer 219. The opaque organic material 220a has a black color so that it becomes a black matrix. The opaque organic material 220a protects the thin film transistor T and the storage capacitor C from the external impact. A transparent organic or inorganic material can be employed as a TFT-protection layer instead of the opaque organic material 120a. However, an additional process of forming a black matrix on the upper substrate is required to use the transparent material.

Figure 5D:
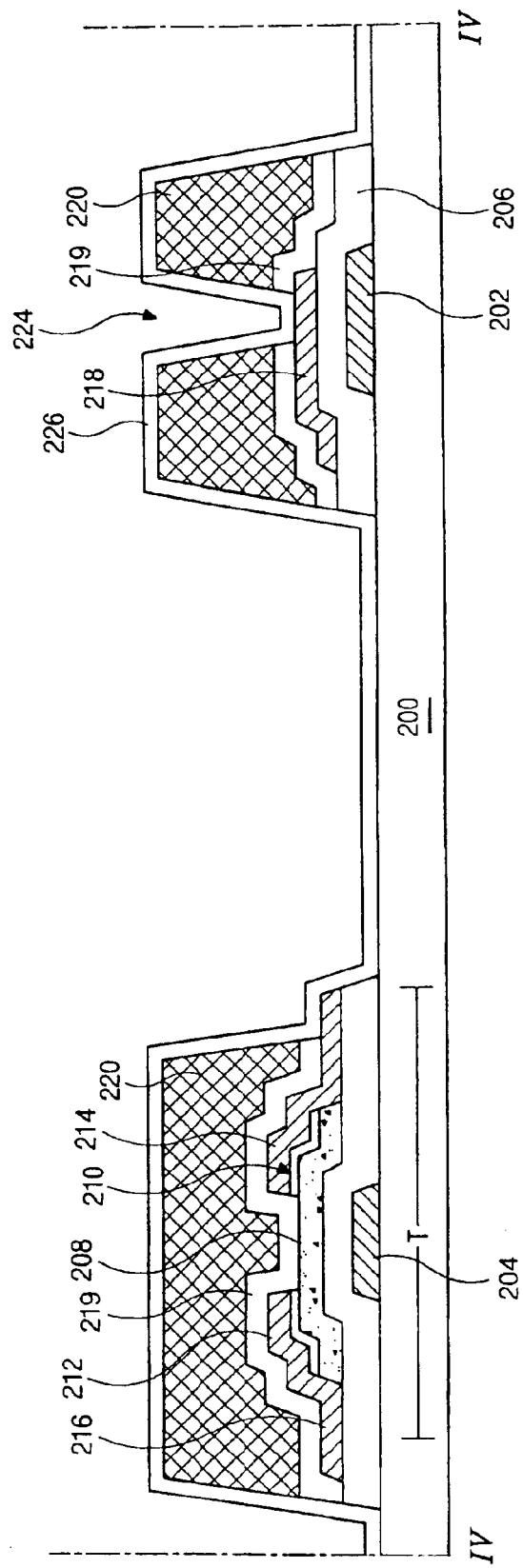

FIG. 5D shows the process step of forming a black matrix and a first transparent electrode. The opaque organic material 220a formed on the second insulating layer 219 is patterned so that a black matrix 220 is formed over the thin film transistor T, the data line 216, and the gate line 202. In the second embodiment, when patterning the opaque organic material 120a to form the black matrix 220, an end side portion of the drain electrode 214 is exposed unlike the first embodiment. Further, a storage contact hole 224 is formed exposing a portion of the storage metal layer 218. Moreover, when patterning the opaque organic material 220a, portions of the first and second insulating layers 206 and 219 corresponding to the pixel region P are also removed to expose the substrate 200. With exposing the end side portion of the drain electrode 214 in the second embodiment, instead of the drain contact hole 122 in the first embodiment, the contact between the drain electrode 214 and the first transparent electrode layer 226 can be improved.

After forming the black matrix 220, the first transparent electrode layer 226 formed of indium tin oxide (ITO) or indium zinc oxide (IZO) is deposited over the entire surface of the substrate 200, so that it covers the black matrix 220, the thin film transistor T and the storage capacitor C. The first transparent electrode layer 226 contacts the storage metal layer 218 and flanks on the drain electrode 314 through the storage contact hole 224. It is difficult to form a tiny contact hole, such as a drain contact hole, through the opaque organic material 220a, and the residues may be clogged in the contact hole. Therefore, the end side portion of the drain electrode 214 is completely exposed, as shown in 5D, during patterning the opaque organic material 220a to resolve the contact problem.

Meanwhile, the first transparent electrode layer 226 prevents a developer for patterning color filters in a later step from penetrating into the gate insulation layer 206. As described above, the step portions of the gate line 202 and gate electrode 204, the gate insulation layer 206 may be formed with poor quality and may have defects such as pinholes and cracks. Therefore, when patterning the color filters, the developer for the color filters may penetrate into the gate insulation layer 206 and then deteriorate the gate line 202 and the gate electrode 204. By forming the first transparent electrode layer 226, such deterioration can be prevented and process stability can be provided.

Figure 5E:
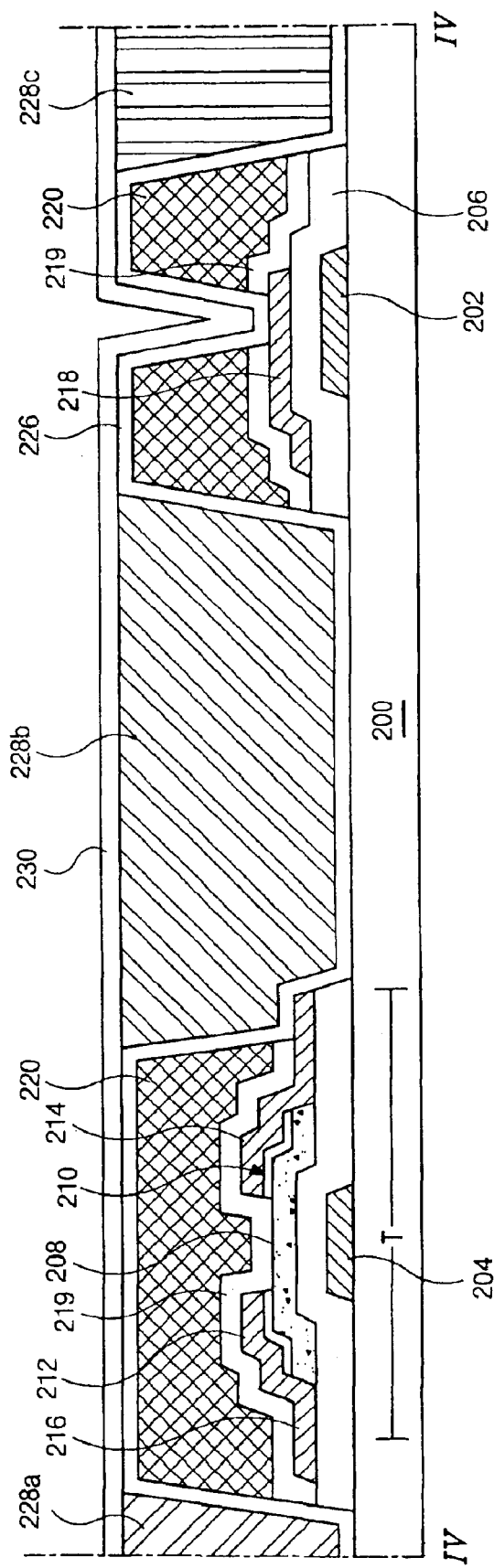

In FIG. 5E, color resin is formed on the first transparent electrode layer 226 and then patterned to form color filters 228a, 228b, and 228c. As described before, the color filters are formed in the pixel regions P. Thereafter, a second transparent electrode layer 230 is formed on the color filters 228 and the exposed portions of the first transparent electrode layer 226. The second transparent electrode layer 230 may be formed of indium tin oxide (ITO) or indium zinc oxide (IZO) like the first transparent electrode layer 226. As shown in FIG. 5E, the second transparent electrode layer 230 contacts the first transparent electrode layer 226 at both sides of the color filter 228.

Figure 5F:
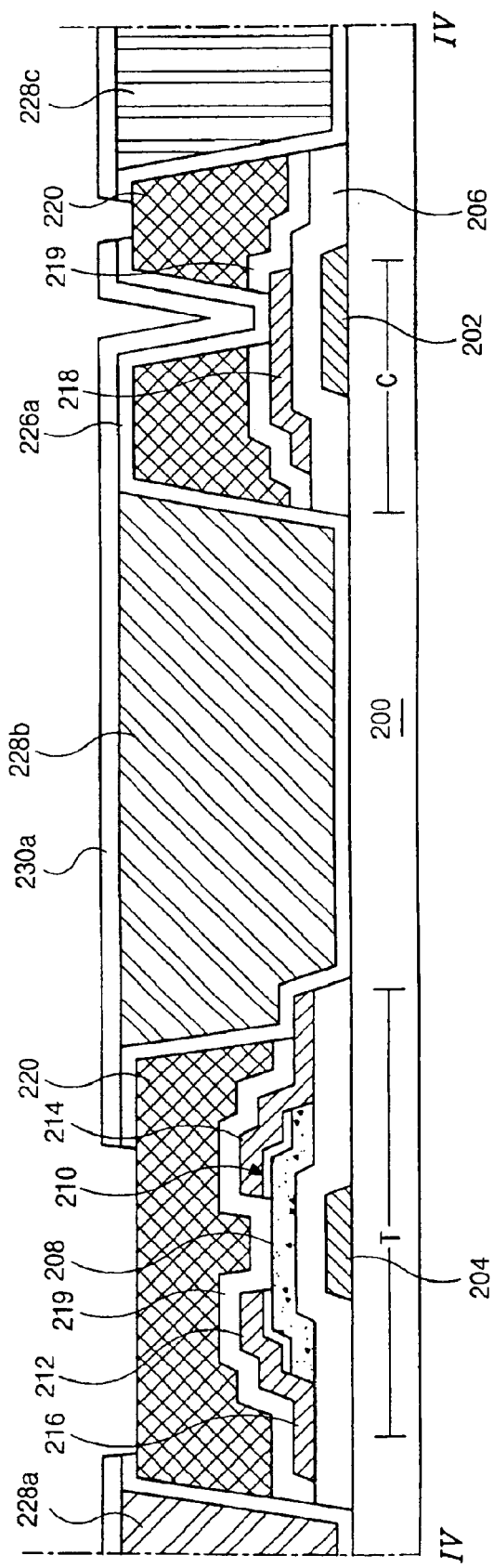

FIG. 5F shows the process step of patterning the first and second transparent electrode layers 226 and 230 to form a double-layered pixel electrode (i.e., often referred as a sandwich pixel electrode). As shown, the first and second transparent electrode layers 226 and 230 are simultaneously patterned with the same mask, so that the sandwich pixel electrode is formed corresponding to each pixel region P. Alternatively, the first transparent electrode layers 226 may be first patterned and then the color filters formed thereon. Thereafter, the second transparent electrode layer 230 may be patterned. The sandwich pixel electrode is comprised of a first pixel electrode 226a and a second pixel electrode 230a.

In the second embodiment, the black matrix 220 does not have the drain contact hole unlike the first embodiment. It is difficult to form a contact hole through the opaque organic material. Therefore, when forming the black matrix over the thin film transistor, the drain contact hole is not formed to provide the process stability according to the second embodiment of the present invention.

According to the present invention, the COT-structural array substrate has color filters with a black matrix. The opaque organic material over the thin film transistor acts as not only the black matrix but also the TFT-protection layer. Therefore, the present invention simplifies the fabrication process and reduces the production cost. Furthermore, since the black matrix is formed in the array substrate, it is not required to consider an aligning margin when designing and aligning the lower and upper substrates, thereby increasing an aperture ration.

It will be apparent to those skilled in the art that various modifications and variations can be made in the liquid crystal display device having an array substrate of a thin film transistor structure and a manufacturing method thereof of the present invention without departing from the spirit or scope of the inventions. Thus, it is intended that the present invention covers the modifications and variations of this invention provided they come within the scope of the appended claims and their equivalents.

What is claimed is:

1. A liquid crystal display device having an array substrate, comprising:

a plurality of gate lines and data lines over the array substrate, the gate and data lines defining a pixel region;

a thin film transistor formed at each crossing region of the gate lines and the data lines, the thin film transistor including a gate electrode, an active layer, a source electrode, and a drain electrode;

a black matrix over the thin film transistor, exposing a portion of the drain electrode;

a first pixel electrode at the pixel region, contacting the exposed portion of the drain electrode;

a color filter on the first pixel electrode at the pixel region; and a second pixel electrode on the color filter, contacting the first pixel electrode.

2. The device according to claim 1, further comprising a first insulating layer between the gate electrode and the active layer.

3. The device according to claim 2, further comprising a second insulating layer either on the thin film transistor or on the black matrix.

4. The device according to claim 2, wherein the first insulating layer is formed of an inorganic material.

5. The device according to claim 4, wherein the inorganic material is selected from the group consisting of silicon nitride and silicon oxide.

6. The device according to claim 2, further comprising a storage capacitor on the first insulating layer.

7. The device according to claim 6, wherein the first pixel electrode contacts the storage capacitor through a storage contact hole in the black matrix.

8. The device according to claim 1, wherein the first pixel electrode contacts the drain electrode through a drain contact hole in the black matrix.

9. The device according to claim 1, wherein the black matrix exposes an end side portion of the drain electrode, so that the first pixel electrode directly contacts the end side portion of the drain electrode.

10. The device according to claim 1, further comprising an ohmic contact layer between the active layer and the source and drain electrodes.

11. The device according to claim 1, wherein the first pixel electrode directly contacts the substrate.

12. A method of forming a liquid crystal display device having an array substrate, comprising:

forming a plurality of gate lines and data lines over the array substrate, the gate and data lines defining a pixel region;

forming a thin film transistor formed at each crossing region of the gate lines and the data lines, the thin film transistor including a gate electrode, an active layer, a source electrode, and a drain electrode;

forming a black matrix over the thin film transistor, exposing a portion of the drain electrode;

forming a first pixel electrode at the pixel region, contacting the exposed portion of the drain electrode;

forming a color filter on the first pixel electrode at the pixel region; and forming a second pixel electrode on the color filter, contacting the first pixel electrode.

13. The method according to claim 12, further comprising forming a first insulating layer between the gate electrode and the active layer.

14. The method according to claim 13, further comprising forming a second insulating layer either on the thin film transistor or on the black matrix.

15. The method according to claim 13, further comprising forming a second insulating layer on both the thin film transistor and the black matrix.

16. The method according to claim 13, wherein the first insulating layer is formed of an inorganic material.

17. The method according to claim 16, wherein the inorganic material is selected from the group consisting of silicon nitride and silicon oxide.

18. The method according to claim 13, further comprising forming a storage capacitor on the first insulating layer.

19. The method according to claim 18, wherein the first pixel electrode contacts the storage capacitor through a storage contact hole in the black matrix.

20. The method according to claim 12, wherein the first pixel electrode contacts the drain electrode through a drain contact hole in the black matrix.

21. The method according to claim 12, wherein the black matrix exposes an end side portion of the drain electrode, so that the first pixel electrode directly contacts the end side portion of the drain electrode.

22. The method according to claim 12, further comprising forming an ohmic contact layer between the active layer and the source and drain electrodes.

23. The method according to claim 12, wherein the first pixel electrode directly contacts the substrate.

24. The method according to claim 12, wherein the forming first and second pixel electrodes comprises, depositing a first transparent metal electrode layer over the substrate;

depositing a second transparent metal electrode layer over the first transparent metal electrode layer; and patterning the first and second transparent metal electrode layers at the same time.

* * * * *